United States Patent [19]
Ohyama et al.

[11] Patent Number: 5,199,085
[45] Date of Patent: Mar. 30, 1993

[54] APPARATUS FOR RESTORING ORIGINAL IMAGE FROM DEGRADED IMAGE

[75] Inventors: Nagaaki Ohyama, Kawasaki; Toshiaki Wada, Tama, both of Japan

[73] Assignee: Olympus Optical Co., Ltd., Tokyo, Japan

[21] Appl. No.: 671,495

[22] Filed: Mar. 19, 1991

[30] Foreign Application Priority Data

Mar. 28, 1990 [JP] Japan ................................ 2-79717

[51] Int. Cl.$^5$ .............................................. G06K 9/36
[52] U.S. Cl. ........................................ 382/54; 358/447; 358/463
[58] Field of Search ............................ 382/31, 32, 54; 364/572, 574; 340/794, 795; 358/447, 463

[56] References Cited

U.S. PATENT DOCUMENTS

| | | | |
|---|---|---|---|
| 4,379,292 | 4/1983 | Minato et al. | 340/703 |
| 4,637,056 | 1/1987 | Sherman et al. | 382/31 |
| 4,908,876 | 3/1990 | DeForest et al. | 382/31 |
| 5,047,968 | 9/1991 | Carrington et al. | 382/54 |

OTHER PUBLICATIONS

IEEE Transactions on Pattern Analysis and Machine Intelligence PAMI-6: 721-741; pp. 614-634.

Primary Examiner—Leo H. Boudreau
Assistant Examiner—David Fox
Attorney, Agent, or Firm—Frishauf, Holtz, Goodman & Woodward

[57] ABSTRACT

An image restoration apparatus comprises an image display device for displaying an image estimated as a nondegraded original image, a lens system for focusing the estimated image displayed on the image display device, an image input means for photographing an image focused by the lens system and for receiving the photographed image as image information, a comparing means for comparing the input image information received by the image input means with degraded image information prepared beforehand to obtain a difference therebetween, and a restoring means for performing restoration of an original image by changing the estimated image by using a random number on the basis of the difference calculated by the comparing means.

5 Claims, 3 Drawing Sheets

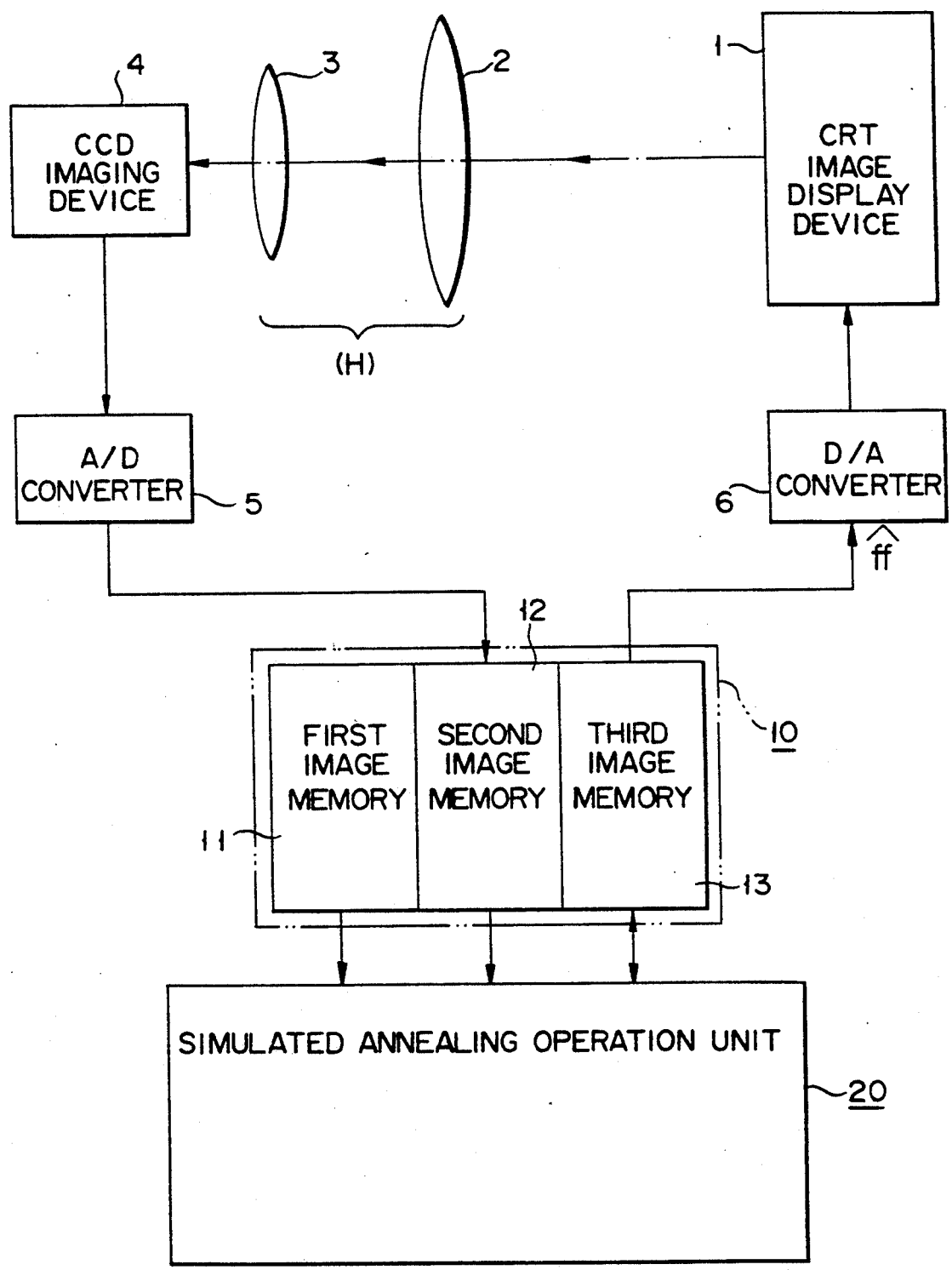
F I G. 1

APPARATUS FOR RESTORING ORIGINAL IMAGE FROM DEGRADED IMAGE

BACKGROUND OF THE INVENTION

1. Field of the Invention

The present invention relates to an image restoration apparatus for restoring an original image from a degraded image.

2. Description of the Related Art

In a conventional image restoration apparatus of this type, in order to perform image restoration, a general-purpose digital computer is used to sequentially process each pixel of image data stored in an image memory. Sequential processing in units of pixels i performed by changing a state of each pixel by a random number, thereby restoring the image. At the time of image restoration, a photographic lens system which may cause image degradation is modeled, and restoration processing is executed using this lens system model.

Since the conventional image restoration apparatus restores an image while the pixel is sequentially changed using a random number, multiplications having a number which is a square of the number of all pixels are required every time one pixel is changed. Even if restoration processing is to be performed to an image having a normal size of 512×512 pixels, it is very difficult to finish restoration processing within a short period of time.

The conventional image restoration apparatus executes restoration processing using the photographic lens system model. In this case, if the photographic lens system which causes image degradation is a lens system having a large aberration and distortion, it is impossible to accurately model the photographic lens system required for the restoration processing. For this reason, high-precision image restoration cannot be performed.

SUMMARY OF THE INVENTION

It is therefore an object of the present invention to provide an image restoration apparatus capable of performing restoration processing from a degraded image to obtain an original image within a short period of time and at the same time performing image restoration with high precision when an original image is to be restored from a degraded image photographed with a lens system having a large aberration and distortion.

In order to achieve the above object, the present invention comprises the following basic means.

More specifically, an image restoration apparatus comprises an image display device for displaying an image estimated as a nondegraded original image, a lens system for focusing the estimated image displayed on the image display device, image input means for photographing an image focused by the lens system and receiving the photographed image as image information, comparing means for comparing the input image information received by the image input means with degraded image information prepared beforehand to obtain a difference therebetween, and restoring means for performing restoration of an original image by changing the estimated image by using a random number on the basis of the difference calculated by the comparing means.

By the above means, the following function can be derived. Part (arithmetic operation) of image restoration processing executed while the pixel is changed by using a random number is optically performed. High-speed processing can be performed to greatly reduce the processing time. The lens system which causes image degradation, i.e., the lens system used in the photographic mode is directly used in restoration processing of an image as an optical execution processing system. Even if a degraded image photographed by a lens system having a large aberration or distortion is to be restored, high-precision image restoration can be performed. Therefore, the conventional drawback caused by inaccurate modeling can be eliminated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 4 are views showing an image restoration apparatus according to an embodiment of the present invention, in which:

FIG. 1 is a block diagram showing an overall arrangement of the image restoration apparatus;

FIG. 2 is a block diagram showing a detailed arrangement of a simulated annealing operation unit; and FIGS. 3 and 4 are views showing optical systems for explaining a basic principle of the present invention.

DETAILED DESCRIPTION OF THE PREFERRED EMBODIMENT

The basic principle of an image restoration apparatus according to the present invention will be described with reference to FIGS. 3 and 4 prior to a detailed description of the arrangement and operation of the embodiment.

Figure 3:
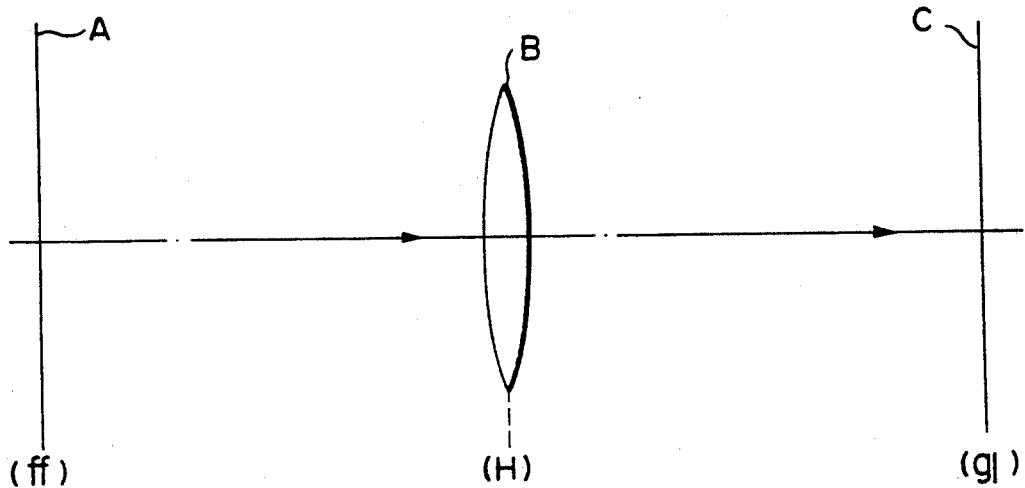
Figure 4:
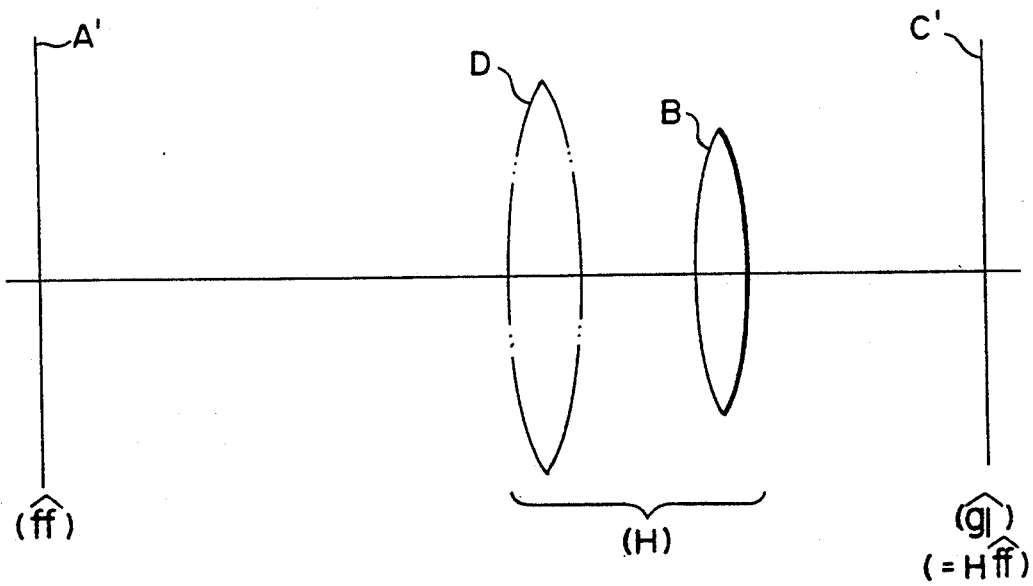

FIG. 3 shows an optical system in a photographic mode, and FIG. 4 shows an optical system in a restoration mode. Assume that an original image $f$ located on an object plane A in the photographic mode is focused on an image plane C through a photographic lens system B having a focusing characteristic H, and that the image is photographed on the image plane C. In this case, an input image on the object plane A can be converted into an n-dimensional vector as follows:

$$f = [f_1, f_2 \ldots f_n]$$

A focused image on the image plane C is similarly represented by an m-dimensional vector as follows:

$$g = [g_1, g_2 \ldots g_m]$$

When the focusing characteristic of the photographic lens system B is represented by a matrix H having a size of m×n, the photographed image (i.e., the focused image on the image plate C) is represented as follows:

$$g = Hf \qquad (1)$$

In general, the photographed image g becomes a degraded image due to the aberration and distortion of the photographic lens system.

Image restoration is herein defined as an operation for obtaining the original image f or an image close thereto from the degraded image g.

As shown in FIG. 4, in order to restore an image, an image estimated as a nondegraded original image is displayed on a display screen A'. The estimated image is defined as follows:

$$\hat{f} = [\hat{f}_1, \hat{f}_2, \ldots, \hat{f}_n]$$

The estimated image $\hat{f}$ is focused on the incident plane C' by the same photographic lens system B to obtain a focused image as follows:

$$\hat{g} = [\hat{g}_1, \hat{g}_2, \ldots, \hat{g}_m]$$

In this case, a cost function E represented by the following equation is calculated:

$$E = \|g - \hat{g}\|^2 = \|g - H\hat{f}\|^2$$

where "$\| \; \|$" in equation (2) represents the vector norm. Each value of pixel $\hat{f}_i$ (i=1, 2, ..., n) of the estimated image $\hat{f}$ is repeatedly changed every given change amount $\Delta f$ called a grain to obtain an estimated image $\hat{f}$ which minimizes the cost function E.

When the same optical layout as in the photographic mode cannot be achieved in the image restoration mode (e.g., a distance between the object plane A and the lens system B in the restoration mode is different than in the photographic mode), a correction lens system D is added, as indicated by the alternate long and two short dashed line in FIG. 4. As a result, the same focusing characteristic H as that between the object plane A and the image plane C in the photographic mode can be obtained between the display screen A' and the incident plane C' in the image restoration mode.

The cost function is not limited to the above equation (2). For example, a complicated form may be employed in consideration of future information.

In a normal operation, a large number of local minimal points are represented by the cost function E. In order to converge the final value to a global minimal point without converting the final value to a local minimal point, a simulated annealing technique is used. This technique will be described in detail below.

First Step

An estimated image $\hat{f}_1$ is displayed on the display screen A' and is focused on the incident plane C' by the correction lens system D and the photographic lens system B to obtain a focused image $H\hat{f}_1$. A cost function $E_1$ is obtained by the above equation (2) using the focused image $H\hat{f}_1$ and the degraded image g.

Second Step

An estimated image $\hat{f}_2$ is obtained such that the value of one pixel $f_i$ randomly selected from the estimated image $\hat{f}_1$ is changed by using the small change amount $\Delta f$ called a grain. As in the first step, the resultant estimated image $\hat{f}_2$ is displayed on the display screen A'. The displayed estimated image $\hat{f}_2$ is focused on the incident plane C' by the correction lens system D and the photographic lens system B, thereby obtaining a focused image $H\hat{f}_2$. A cost function $E_2$ is obtained by equation (2) using the resultant focused image $H\hat{f}_2$ and the degraded image g.

Third Step

A difference $\Delta E$ between the cost function $E_2$ for the estimated image $\hat{f}_2$ and the cost function $E_1$ for the estimated image $\hat{f}_1$ is obtained by the following equation:

$$\Delta E = E_2 - E_1$$

If the difference $\Delta E$ is negative, the change amount $\Delta f$ for the value of pixel $f_i$ of the first estimated image $\hat{f}_1$ is accepted, and the flow returns to the first step by using the estimated image $\hat{f}_2$ as a new estimated image. However, if the difference $\Delta E$ is positive, the change amount $\Delta f$ for the value of pixel $f_i$ is accepted in accordance with a probability complying with a Boltzmann distribution defined as follows:

$$P(\Delta E) = e - \frac{\Delta E}{kT} \qquad (4)$$

The flow returns to the second step by using the estimated image $\hat{f}_1$ as a new estimated image, and by using the cost function $E_2$ which is obtained by the second step as the cost function $E_1$. When the change in $\Delta f$ is not accepted, the estimated image is returned to the originally estimated image $\hat{f}_1$, and the flow returns to the second step. In equation (4), T is a parameter corresponding to a statistical thermomechanical temperature, and k is a constant.

The operations in the first to third steps are repeatedly performed to change each pixel of the estimated image. At this time, the parameter T is set to be a large value at the beginning and is then gradually reduced upon repetition of the above operation. With this calculation technique, the final value can be converged into a global minimal value without being converted into a local minimal value. An estimated image obtained by sufficient convergence to a global minimal point is a restored image.

As described in the items of [First Step] and [Second Step], a calculation for obtaining a product between the matrix H representing a focusing characteristic and the estimated image $\hat{f}$ is optically performed, thereby shortening the processing time. Since the same lens system as in the photographic mode is used in the restoration mode, errors caused by optical system modeling do not occur.

The detailed arrangement and operation of this embodiment will be described with reference to FIGS. 1 and 2.

A part corresponding to the optical system of FIG. 1, i.e., the CRT image display device 1, the correction lens system 2, the photographic lens system 3, the CCD imaging device 4, and the like will be descried below. The CRT image display device 1 receives estimated image information $\hat{f}$ stored in a third image memory 13 of an image memory device 10 through a D/A converter 6 and displays the estimated image information $\hat{f}$. The estimated image displayed on the device 1 is focused onto an imaging plane of the CCD imaging device 4 serving as one of the constituting components of the image input means through the lens system consisting of the correction lens system 2 and the photographic lens system 3. The lens system 3 is the same as that used for photographing an original image.

The correction lens system 2 is arranged to adjust a focusing characteristic. More specifically, the focusing characteristic as a synthesized focusing characteristic of the lens system 2 and the photographic lens system 3 is set to be identical with the focusing characteristic H of the photographic lens system in the photographic mode. When a geometric relationship between the display screen of the CRT image display device 4, the photographic lens system 3, and the imaging plane of the CCD imaging device 4 is identical to that between the object plane, the photographic lens system, and the image plane (imaging plane), the correction lens system 2 can be omitted. When a vector of the image displayed on the CRT image display device 1 is given as $\hat{f}$, and a focusing characteristic of a composite lens system consisting of the correction lens system 2 and the photographic lens system 3 is represented by a matrix H, an image focused on the imaging plane of the CCD imaging device 4 is given as Hf. An output from the imaging device 4, i.e., information of the focused image is sent to the image memory device 10 through the A/D converter 5.

A part except for the optical system will be described below. The image memory device 10 has first and second image memories 11 and 12 and the third image memory 13. The first image memory 11 stores the degraded image g/subjected to restoration processing. The second image memory 12 stores focused digital image information supplied through the A/D converter 5. The third image memory 13 stores the estimated image $\hat{f}$. An initial storage image of the estimated image $\hat{f}$ need not be limited to any specific image. A simulated annealing operation unit 20 is connected to the image memory device 10.

Figure 2:
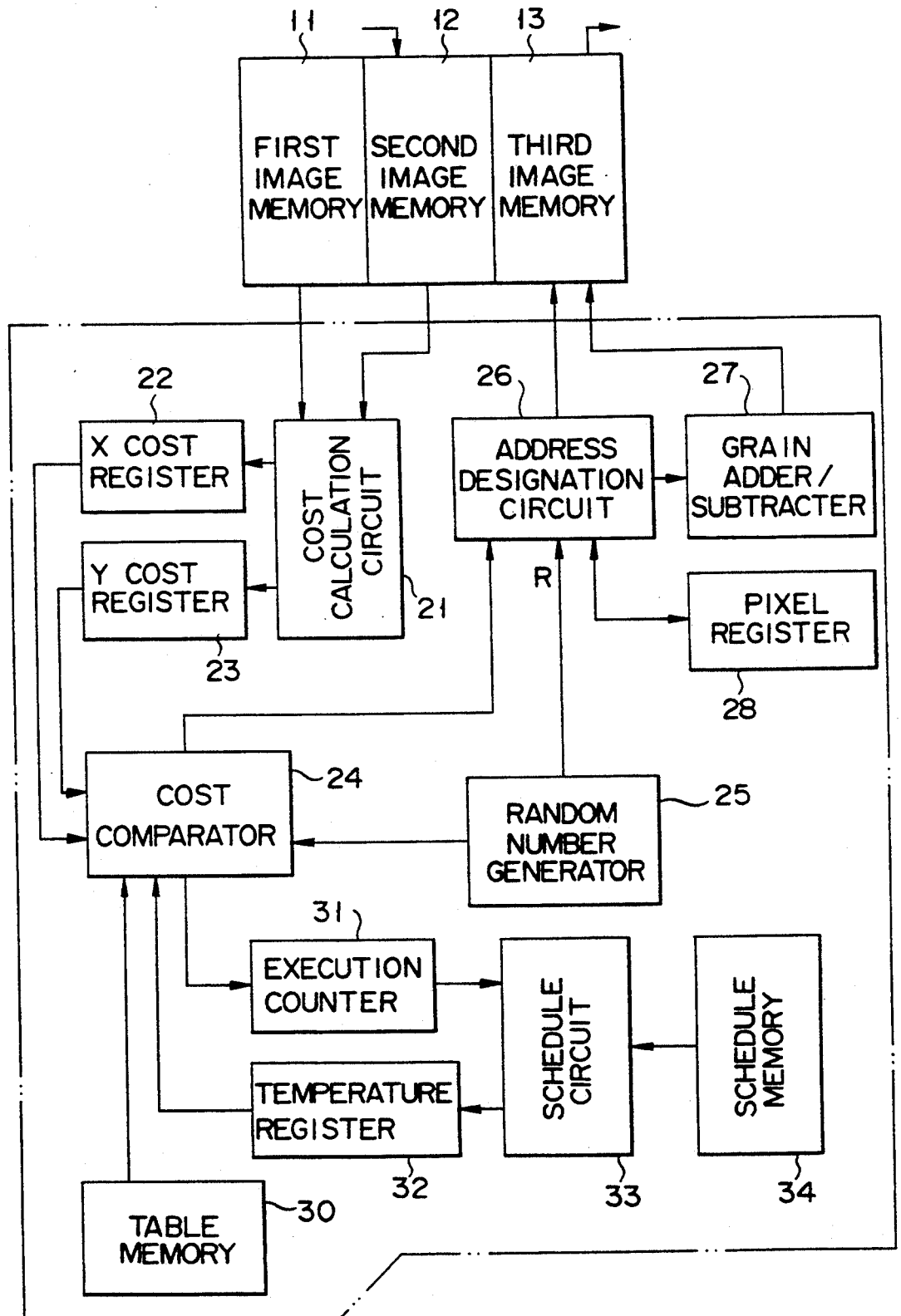

As shown in FIG. 2, the simulated annealing operation unit 20 includes a cost calculation circuit 21, an X cost register 22, a Y cost register 23, a cost comparator 24, a random number generator 25, an address designation circuit 26, a grain adder/subtracter 27, and a pixel register 28. The simulated annealing operation unit 20 further includes a table memory 30, an execution counter 31, a temperature register 32, a schedule circuit 33, and a schedule memory 34.

An operation of the image restoration apparatus having the above arrangement according to this embodiment will be described below.

First Step

The estimated image $\hat{f}_1$ stored in the third memory 13 is converted into analog data by the D/A converter 6 as described above, and the analog data is supplied to the CRT image display device 1 and is displayed thereon. The displayed estimated image $\hat{f}_1$ is focused on the imaging plane of the CCD imaging device 4 by the correction lens system 2 and the photographic lens system 3. The focused image H$\hat{f}_1$ is picked up by the CCD imaging device 4, and the imaging information is converted into digital data by the A/D converter 5. The digital data is stored in the second image memory 12.

The image H$\hat{f}_1$ stored in the second image memory 12 and the degraded image g/stored in the first image memory 11 are input to the cost calculation circuit 21. The cost function $E_1$ represented by equation (2) is calculated by the cost calculation circuit 21, and a calculation result is stored in the X cost register 22.

Second Step

A given uniform random number R generated by the random number generator 25 is input to the address designation circuit 26. In response to the random number R, the address designation circuit 26 is operated to select one pixel of the estimated image $\hat{f}_1$ of the third image memory 13. The small change amount (grain) Δf is added to or subtracted from the selected pixel by the grain adder/subtracter 27. Processing for determining whether the amount Δf is added to or subtracted from the pixel is determined by the given uniform random number generated by the random number generator 25.

Assume that the selected pixel is defined as i, and that a new estimated image obtained by a small variation of the value of the pixel $f_i$ and stored in the third image memory 13 is defined as $\hat{f}_2$. The pixel address information is stored in the pixel register 28. The same processing as in [First Step] is performed for the estimated image $\hat{f}_2$ stored in the third image memory 13.

The estimated image $\hat{f}_2$ is converted into analog data by the D/A converter 6, and the analog data is displayed on the CRT image display device 1. This display image is focused on the imaging plane of the CCD imaging device 4 by the correction lens system 2 and the photographic lens system 3. This focused image H$\hat{f}_2$ is converted into digital data by the A/D converter 5, and the digital data is stored in the second image memory 12. The cost function $E_2$ represented by equation (2) is performed by the cost calculation circuit 21 using the degraded image g/ stored in the first image memory 11 and the focused image H$\hat{f}_2$ stored in the second image memory 12. This calculation result is stored in the Y cost register 23.

Third Step

The cost comparator 24 calculates a difference ΔE between the cost function $E_1$ stored in the X cost register 22 and the cost function $E_2$ stored in the Y cost register 23.

If the difference ΔE is negative, the cost function $E_2$ stored in the Y cost register 23 is stored in the X cost register 22, and the execution counter 31 is incremented by one. The flow advances to the second step, and a new estimated image is repeatedly formed.

If the different ΔE is, however, positive, a value P(ΔE) corresponding to the value of the temperature parameter T stored in the temperature register 32 for the difference ΔE is obtained from a table prestored in the table memory 30, i.e., a table representing a relationship between the cost difference ΔE calculated by equation (4), the temperature parameter T, and the probability P(ΔE). The probability P(ΔE) is compared with the random number B generated by the random number generator 25. If the random number R is smaller than the probability P(ΔE), the cost function $E_2$ of the Y cost register 23 is stored in the X cost register 22, and the execution counter 31 is incremented by one. The flow then returns to the second step.

When the random number R is P(ΔE) or more, the grain Δf is added to or subtracted from the estimated image $\hat{f}_2$ stored in the third image memory 13, i.e., from the value of the pixel $f_i$ corresponding to the number stored in the pixel register 28. That is, a subtraction is performed when the grain is added, or an addition is performed when the grain is subtracted at the time of transition from $\hat{f}_1$ to $\hat{f}_2$. As a result, the content of the third image memory 13 returns to the original estimated image $\hat{f}_1$. The operations are repeated from [Second Step].

The schedule circuit 33 decreases the temperature parameter T stored in the temperature register 32 in accordance with the schedule stored in the schedule memory 34 with reference to the value of the execution counter 31.

In this embodiment, when the value of the execution counter 31 reaches a given value, image restoration processing is ended. At this time, the estimated image stored in the third image memory 13 is a restored image.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image restoration apparatus comprising:
   an image display means for displaying an image estimated as a nondegraded original image;
   lens system means for focusing the estimated image displayed on said image display means, said lens system means in a restoration mode including a correction lens system for adjusting a focusing characteristic;
   image input means for receiving image information of said estimated image by photographing the estimated image displayed on the image display means by use of said lens system means;
   comparing means for comparing the input image information received by said image input means with degraded image information prepared beforehand to obtain a difference therebetween; and
   restoring means for performing restoration of an original image by changing the estimated image by using a random number of the basis of the difference obtained by said comparing means.

2. An image restoration apparatus according to claim 1, wherein said restoration means includes a random number circuit and said estimated image is altered based on a random number produced in said random number circuit so that an output difference from said comparing means can be minimized.

3. An image restoration apparatus comprising:
   image display means for displaying an estimated image corresponding to an original image prior to degradation;
   optical system means for focusing the estimated image displayed on said image display means, said optical system means including one of:
   an original lens system by which the original image is photographed, and
   a lens system having focusing characteristics identical to characteristics of the original lens system;
   image input means for receiving image information of said estimated image by photographing the estimated image displayed on the image display means by use of the optical system means;
   comparing means for comparing the image information of said estimated image received by said image input means with information of a degraded image obtained by photographing said original image beforehand, and outputting a difference corresponding therebetween;
   restoration means for restoring said degraded original image by altering said estimated image shown on said image display means in accordance with said difference.

4. An image restoration apparatus according to claim 3, wherein said restoration means includes a random number circuit and said estimated image is altered based on a random number produced in said random number circuit so that an output difference from said comparing means can be minimized.

5. An apparatus according to claim 3, wherein said optical system in a restoration mode includes a correction lens system for adjusting a focusing characteristic.

* * * * *